United States Patent

[11] 3,609,157

| [72] | Inventors | Leslie Thomas Allan<br>Cambridge;<br>Geoffrey Tattersall Newbold, Saffron Walden; Albert Percival, Hauxton, all of England |
|---|---|---|
| [21] | Appl. No. | 729,899 |
| [22] | Filed | May 17, 1968 |
| [45] | Patented | Sept. 28, 1971 |
| [73] | Assignee | Fisons Pest Control Limited<br>Harston, Cambridgeshire, England |
| [32] | Priority | May 23, 1967 |
| [33] | | Great Britain |
| [31] | | 23803/67 |

[54] SUBSTITUTED IMIDAZOPYRIDINES
5 Claims, No Drawings

[52] U.S. Cl. .................................................. 260/295,
260/294.8 C, 260/294.9, 260/295 F, 260/296 H,
71/92, 71/93
[51] Int. Cl. ........................................................ C07d 31/36
[50] Field of Search .......................................... 260/296 H,
296 P, 295 F, 294.8 C, 294.9

[56] References Cited
UNITED STATES PATENTS
3,459,759   8/1969   Rochling et al. .............. 260/296

*Primary Examiner*—Alan L. Rotman
*Attorney*—Wenderoth, Lind & Ponack

ABSTRACT: Substituted imidazoypyridines of the formula

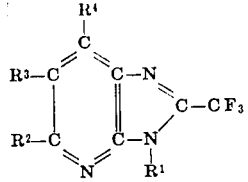

and physiological active salts and N-oxides thereof, wherein $R^1$ represents $R^5$ or $COOR^5$ wherein $R^5$ represents alkenyl of 2 to 4 carbon atoms, alkynyl of 2 to 4 carbon atoms, aralkyl of 7 to 13 carbon atoms or cycloalkyl of 3 to 6 carbon atoms and wherein $R^2$, $R^3$ and $R^4$ are the same or different and represent hydrogen, halogen, alkyl of 1 to 6 carbon atoms, nitro or cyano are biocidally active and are particularly useful as herbicides.

SUBSTITUTED IMIDAZOPYRIDINES

The present invention relates to certain substituted imidazopyridines which have been found to possess physiological activity, to their preparation and to agricultural and other compositions containing the same. The substituted imidazopyridines as hereinafter described are active in many fields and these compounds are exceptionally active as herbicides.

Accordingly the present invention is for the substituted imidazopyridines of the formula:

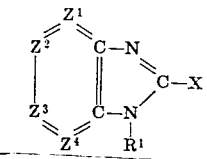

where one of the groups $Z^1$, $Z^2$, $Z^3$ and $Z^4$ is a nitrogen atom and the other three groups are $CR^2$, $CR^3$ and $CR^4$ respectively, wherein $R^1$ is selected from $R^5$, $-C(=A)BR^5$ or $-SO_2R^6$, where A is oxygen or sulphur, B is oxygen or sulphur or a single bond, $R^5$ is alkenyl (for example allyl, vinyl and butenyl), alkynyl (for example ethynyl propargyl or butynyl), aralkyl (for example benzyl or naphthylmethyl), substituted alkenyl (for example chlorallyl or dichlorallyl), substituted alkynyl (for example chlorbutynyl), substituted aralkyl (for example chlorbenzyl or dichlorbenzyl), cycloaliphatic (for example cyclopropyl or cyclohexyl), substituted cycloaliphatic or heterocyclic (for example pyridyl or thiazolyl); and $R^6$ is alkyl (for example methyl, ethyl, isopropyl, tertiarybutyl, hexyl, decyl or dodecyl), substituted alkyl (for example 1,1-dichloroethyl, 2methyl-4-chloro-phenoxymethyl, 2,4-dichlorophenoxymethyl, chloromethyl or bromoethyl), aryl (for example phenyl or naphthyl), substituted aryl (for example 2,3,6-trichlorophenyl, tolyl or xylyl), alkenyl (for example allyl, vinyl or butenyl), alkynyl (for example ethynyl, propargyl or butynyl), aralkyl (for example benzyl or naphthylmethyl), substituted alkenyl (for example chloroallyl or dichloroallyl), substituted alkynyl (for example chlorobutynyl), substituted aralkyl (for example chlorobenzyl or dichlorobenzyl), cycloaliphatic (for example cyclopropyl or cyclohexyl), substituted cycloaliphatic or heterocyclic (for example pyridyl or thiazolyl), and where $R^2$, $R^3$ and $R^4$ are the same or different and are selected from the group comprising hydrogen, alkyl (for example 1-6 carbon atoms such as methyl, ethyl or propyl), hydroxy, alkoxy (for example methoxy, ethoxy or butoxy), substituted alkoxy, aryloxy (for example phenoxy) or substituted aryloxy (for example chlorophenoxy), nitro, halogen (for example chloro, bromo or fluoro), pseudo-halogen (for example cyano, thiocyano, isothiocyano or azido), substituted alkyl (for example trifluoromethyl, chloromethyl, bromomethyl, trichloromethyl, hydroxymethyl, 2-chloroethyl, 2-hydroxyethyl or 2-methoxyethyl), carboxy, carboxy ester, carboxy amide, N-substituted or di-substituted carboxy amide, amino or mono- or di-substituted amino (for example methylamino, dimethylamino, acetylamino, trifluoroacetylamino, benzenesulfonamido paratoluenesulfonamido methanesulfonamido), thiol, alkylthiol, and oxygenated derivatives thereof (for example — $SOR^7$ or $-SO_2R^7$ where $R^7$ is alkyl), sulphonic acid and esters and amides thereof and substituted amides (for example phenylsulphamyl, ethylsulphamyl, chloroethylsulphamyl) and a heterocyclic ring attached to the imidazopyridine system through a nitrogen atom, radicals, and wherein X is trifluoromethyl or pentafluoroethyl, or a salt or functional derivative of said imidazopyridine, where such exist. According to one embodiment of the invention $Z^4$ is the nitrogen atom.

Some of the imidazopyridines are basic and can form salts with strong acids such as hydrochloric acid.

The imidazopyridines also form quaternary ammonium salts, which are also embraced by the present invention.

Functional derivatives of the substituted imidazopyridines which may be mentioned include the N-oxides.

A preferred embodiment of the invention is for imidazopyridines of the formula:

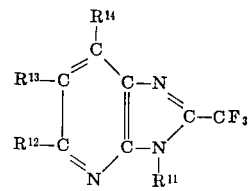

where $R^{11}$ is $-COOR^{15}$ (where $R^{15}$ is cycbalkyl for example cyclohexyl) and $R^{12}$, $R^{13}$ and $R^{14}$ are hydrogen, alkyl (for example of 1–6 carbon atoms such as methyl, ethyl or butyl) or halogen (for example chlorine, bromine or fluorine).

According to a specially preferred embodiment of the invention the imidazopyridine is 6-chloro-1(3)-cyclohexyloxycarbonyl-2-trifluoromethyl-imidazo(4,5-b)pyridine.

The present invention is also for a physiologically active composition and particularly a herbicidal composition which contains as an active component a substituted imidazopyridine as identified above. The physiologically active composition suitable also contains at lease one material selected from the group comprising carriers, wetting agents, inert diluents and solvents.

The present invention is also for the treatment of plants, the soil, land or aquatic areas, or materials, which comprises applying thereon or thereto a physiologically active composition as identified above. The compounds and compositions according to the present invention are suitable for controlling detrimental organisms.

The substituted imidazopyridines according to the present invention generally possess physiological activity. These compounds are useful mainly as herbicides, but they also find use as insecticides, molluscicides or fungicides. Some of the compounds thus show activity against houseflies, mosquitoes and spider mites.

The substituted imidazopyridines have been found to be of particular value as selective herbicides for preemergence use and are also useful for postemergence use. With some crops, preemergence use is of greater importance. The compounds may also be used as total weedkillers.

The substituted imidazopyridines according to the present invention may be prepared by reacting a salt of the diamine of the formula:

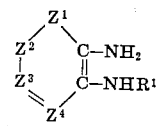

with a trihalogenoacetic acid or pentafluoropropionic acid or a functional derivative thereof, suitable in a medium of an inorganic acid halide. The inorganic halide may be any liquid inorganic halide such as phosphorus oxychloride, phosphorus trichloride, thionyl chloride and the like. It is preferred to use phosphorus oxychloride. Suitably the reactants are refluxed together. Where the product is a trichloromethyl derivative, this is readily converted into the corresponding trifluoromethyl derivative by treatment with a metal fluoride such as antimony fluoride.

The substituted imidazopyridines according to the present invention wherein $R^1$ is the group $-COOR^5$ may be prepared by reacting the corresponding compound wherein $R^1$ is hydrogen with a chloroformate $R^5OCOCl$, in the presence of a base, such as triethylamine. Alternatively, these substituted imidazopyridines may be prepared by reacting an alkali metal salt of the corresponding imidazopyridine derivative with a chloroformate.

The compounds where R¹ is —SO₂R⁶ may be prepared by reacting the corresponding compound where R¹ is hydrogen with a sulphonyl halide R⁶SO₂D, where D is halogen.

If desired the substituted imidazopyridines or salts thereof may be dissolved in a water immiscible solvent, such as for example a high boiling hydrocarbon, suitably containing dissolved emulsifying agents so as to act as a self-emulsifiable oil on addition to water.

The substituted imidazopyridines or salts thereof may also be admixed with a wetting agent with or without an inert diluent to form a wettable powder which is soluble or dispersible in water, or may be mixed with the inert diluent to form a solid or powdery product.

Inert diluents with which the substituted imidazopyridines and salts thereof may be incorporated include solid inert media comprising powdered or divided solid materials, for example, clays, sands, talc, mica, fertilizers and the like, such products either comprising dust or larger particle size materials.

The wetting agents used may comprise anionic compounds such as for example soaps, fatty sulfate esters such as dodecyl sodium sulfate, octadecyl sodium sulfate and cetyl sodium sulfate, fatty aromatic sulfonates such as alkyl-benzene sulfonates or butyl naphthalene sulfonate, more complex fatty sulfonates such as the amide condensation product of oleic acid and N-methyl taurine or the sodium sulfonate or dioctyl succinate.

The wetting agents may also comprise nonionic wetting agents such as for example condensation products of fatty acids, fatty alcohols or fatty substituted phenols with ethylene oxide, or fatty esters and ethers of sugars or polyhydric alcohols, or the products obtained from the latter by condensation with ethylene oxide, or the products known as block copolymers of ethylene oxide and propylene oxide. The wetting agents may also comprise cationic agents such as for example cetyl trimethylammonium bromide and the like.

The physiologically active compositions according to the present invention may contain in addition to the substituted imidazopyridines or salts thereof, other physiologically active materials such as herbicides, insecticides, fungicides and molluscicides. It has been found that particular advantages are obtained with mixtures with other herbicides.

Accordingly, a further embodiment of the present invention is for a herbicidal composition which comprises a mixture of the substituted imidazopyridine as identified above and a second herbicide.

The second herbicide may be for example a phenoxyaliphatic acid, or a substituted urea or a triazine. In respect of selective herbicidal compositions for postemergence use, the second herbicide is suitably a substituted phenoxyaliphatic acid; in respect of selective herbicidal compositions for preemergence use, the second herbicide is suitably a substituted urea or triazine.

In such mixtures, the phenoxyaliphatic acid generally comprises an alkyl and/or halogen substituted phenoxyaliphatic acids, and their salts, for example alkali metal, amine and alkanolamine salts, and functional derivatives, for example esters and amides. These compounds may be of activity such that they are recognized as commercial herbicides, or may be of only slight herbicidal activity. Examples of the substituted phenoxyaliphatic acids which may be mentioned include 2,4-dichlorophenoxyacetic acid, 2-methyl-4-chlorophenoxyacetic acid; 2,4,5-trichlorophenoxyacetic acid, gamma-2,4-dichlorophenoxy-butyric acid, gamma-2-methyl-4-chlorophenoxy-butyric acid, alpha-2-methyl-4-chlorophenoxypropionic acid.

In such mixtures, the substituted urea generally comprises a tri- or tetra-substituted urea such as N'-parachlorophenyl-N,N dimethylurea, N-butyl-N'-(3,4-dichlorophenyl)-N-methylurea, N'-parachlorophenyl-O,N,N-trimethylisourea, N'-p-chlorophenyl-N-methoxy-N-methylurea, N,N-dimethyl-N'-phenylurea.

In such mixtures, the triazine herbicide generally comprises a compound of the formula:

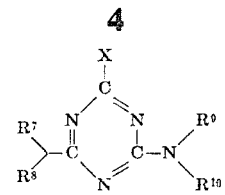

where x is a halogen, OY group or SY group, where Y is an alkyl group, and R⁷, R⁸, R⁹ and R¹⁰ are hydrogen or alkyl, such as 2-chloro-4,6-bisethylamino-1,3,5-triazine or 2-chloro-6-ethylamino-4-isopropylamino-1,3,5-triazine.

A further embodiment of the invention comprises a process for the control of weeds, which comprises the use of a mixture of a substituted imidazopyridine and a second herbicide.

The ratio of the substituted imidazopyridine to the second herbicide may vary over a wide range according to the particular compounds involved and the intended use. In general the ratio of substituted imidazopyridine to second herbicide lies in the range 1:0.1 to 1:15.

These mixtures are of particular value in the control of weeds, and may be more effective and economical than the components used alone. In some cases synergism is observed.

The following examples are given to illustrate the present invention. Parts and percentages are by weight unless otherwise indicated.

EXAMPLE 1

To a stirred solution of 6-chloro-2trifluoromethylimidazo (4,5-b) pyridine (5.6 parts) in dry acetone (40 parts) containing triethylamine (3.5 parts) was added a solution of cyclohexyl chloroformate (5.05 parts) in acetone (40 parts) over a period of 5 minutes. The reaction mixture was then heated under reflux with stirring for 2½hours. After cooling the triethylamine hydrochloride was filtered off and the filtrate evaporated off under reduced pressure to yield crude 6-chloro-1(3)-cyclohexyloxycarbonyl-2-trifluoromethylimidazo (4,5-b) pyridine (7.2 parts, 82 percent yield). Recrystallization from dry light petroleum gave the pure compound as a white crystalline solid, melting point 87–89° C.

Analysis:
Found: C, 48.20; H, 3.85; Cl, 10.50 percent C₁₄H₁₃ClF₃N₃O₂ requires: C, 48.35; H, 3.75; Cl, 10.25 percent In a similar way the following compounds were prepared: 1(3)-cyclohexyloxycarbonyl-5-methyl-2-trifluoromethylimidazo(4,5-b) pyridine, 1(3)-cyclohexyloxycarbonyl-6-nitro-2-trifluoromethylimidazo (4,5-b) pyridine and 1(3)-cyclohexyloxycarbonyl-5-cyano-2-trifluoromethylimidazo (4,5-b) pyridine.

EXAMPLE 2

A solution of 2-benzylamino-3-amino-5-chloropyridine (1.36 parts) in trifluoroacetic acid (15 parts) was heated under reflux (isomantle) for 19 hours. Distillation of the excess acid gave an oil, which was dissolved in a hot mixture of ethanol and water. On cooling, the product, 2-trifluoromethyl-3-benzyl-6-chloroimidazo (4,5-b) pyridine, crystallized and was filtered and dried. Yield, 1.57 parts (86 percent). Melting point 101-3°C.

Analysis:
Found: C, 54.15; H, 2.75; N, 13.35; C₁₄H₉ClF₃N₃ requires: C, 53.95; H, 2.90; N, 13.50 percent.

In a similar manner the following compounds were prepared: 3-allyl-6-chloro-2-trifluoromethylimidazo (4,5-b) pyridine, 3-propargyl-5-chloro-2-trifluoromethylimidazo (4,5-b) pyridine and 3-cyclohexyl-6-chloro-2-trifluoromethylimidazo (4,5-b) pyridine.

EXAMPLE 3

Peas, mustard, linseed, ryegrass, sugarbeet and oats were grown in John Innes potting compost in aluminum pans (7½× 3¾×2 inches—18.8×9.4 ×5 cm.). When the plants had between two and five true leaves they were sprayed with aqueous suspension of 6-chloro-1(3)-cyclohexyloxycarbonyl-2-trifluoromethylimidazo (4,5-b), pyridine at rates corresponding to 160, 20, 10, 5 and 2½ ounces/acre g./0.014 hectare in 80 g. (3631) of suspension which contained 0.5 percent of the commercially available wetting agent Lissapol NX. After 7 days in a controlled environment room the plants were assessed visually for herbicidal damage on a scale in which 0 indicates no herbicidal effect and 100 indicates complete destruction of the plants. Results are tabulated below:

| Species | Rate of application ounces/acre g./0.014 h.) | | | | |
|---|---|---|---|---|---|
| | 160 | 20 | 10 | 5 | 2½ |
| Peas | 50 | 8 | 5 | 3 | 2 |
| Mustard | 100 | 99 | 98 | 98 | 70 |
| Linseed | 100 | 98 | 35 | 20 | 0 |
| Ryegrass | 98 | 8 | 5 | 15 | 0 |
| Sugarbeet | 100 | 100 | 98 | 75 | 60 |
| Oats | 90 | 5 | 3 | 0 | 0 |

EXAMPLE 4

Seeds of peas, mustard, linseed, maize, oats and ryegrass were sown in aluminum pans into potting compost which had been treated with 6-chloro-1(3)-cyclohexyloxycarbonyl-2-trifluoromethylimidazo (4,5-b) pyridine at rates equivalent to 56 and 11.2 kilograms per hectare (50 and 10 pounds per acre). After 22 days growth in a controlled environment the herbicidal effect was assessed on a scale whereby 100 represents no development of the plants and 0 represents development equal to that of plants grown in the untreated soil. The results obtained were as follows:

| Rate, kg./ha. | Species | | | | | |
|---|---|---|---|---|---|---|
| | Peas | Mustard | Linseed | Maize | Oats | Ryegrass |
| 56 | 85 | 100 | 100 | 85 | 100 | 100 |
| 11.2 | 75 | 100 | 100 | 10 | 100 | 100 |

EXAMPLE 5

Seeds of mustard, linseed, oats and ryegrass were sown in aluminum pans into potting compost which had been treated with the compounds identified below at a rate equivalent to 56 and 11.2 kilograms per hectare (50 and 10 pounds per acre). After 22 days growth in a controlled environment the herbicidal effect was assessed on a scale whereby 100 represents no development of the plants and 0 represents development equal to that of plants grown in untreated soil. The results obtained are tabulated below:

| Compound | Rate, kg./hectare | Herbicidal effect | | | |
|---|---|---|---|---|---|
| | | Mustard | Linseed | Oats | Ryegrass |
| 3-benzyl-6-chloro-2-trifluoromethylimidazo (4,5-b) pyridine | 56 | 100 | 100 | 100 | 100 |
| | 11.2 | 100 | 90 | 90 | 100 |
| 3-allyl-6-chloro-2-trifluoromethylimidazo (4,5-b) pyridine | 56 | 100 | 100 | 100 | 100 |
| | 11.2 | 100 | 90 | 90 | 100 |
| 3-propargyl-6-chloro-2-trifluoromethylimidazo (4,5-b) pyridine | 56 | 100 | 100 | 100 | 100 |
| | 11.2 | 100 | 100 | 100 | 100 |
| 3-cyclohexyl-6-chloro-2-trifluoromethylimidazo (4,5-b) pyridine | 56 | 100 | 100 | 100 | 100 |
| | 11.2 | 100 | 100 | 90 | 100 |
| 1(3)-cyclohexyloxycarbonyl-5-methyl-2-trifluoromethylimidazo (4,5-b) pyridine | 56 | 100 | 100 | 100 | 100 |
| | 11.2 | 100 | 90 | 90 | 100 |
| 1(3)-cyclohexyloxycarbonyl-6-nitro-2-trifluoromethyl imidazo (4,5-b) pyridine | 56 | 100 | 100 | 100 | 100 |
| | 11.2 | 100 | 100 | 100 | 100 |
| 1(3)-cyclohexyloxycarbonyl-5-cyano-2-trifluoromethyl imidazo (4,5-b) pyridine | 56 | 100 | 100 | 100 | 100 |
| | 11.2 | 100 | 100 | 100 | 100 |

We claim:
1. A member selected from the group consisting of a substituted imidazopyridine of the formula

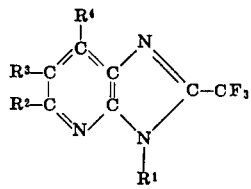

and biocidally active salts and N-oxides thereof, wherein $R^1$ represents $R^5$ or $COOR^5$ wherein $R^5$ represents alkenyl of 2 to 4 carbon atoms, benzyl and naphthylmethyl or cycloalkyl of 3 to 6 carbon atoms and wherein $R^2$, $R^3$ and $R^4$ are the same or different and represent hydrogen, halogen, alkyl of 1 to 6 carbon atoms, nitro or cyano.

2. A substituted imidazopyridine as claimed in claim 1, wherein $R^1$ represents $COOR^5$ and $R^5$ represents cycloalkyl of 3 to 6 carbon atoms.

3. 6-chloro-1(3)-cyclohexyloxycarbonyl-2-trifluoromethylimidazo (4,5-b) pyridine.

4. Biocidally active acid addition salts of the substituted imidazopyridines as claimed in claim 1.

5. Biocidally active quaternary ammonium salts of the substituted imidazopyridines as claimed in claim 1.